United States Patent
Fakoorian et al.

(10) Patent No.: US 11,722,254 B2
(45) Date of Patent: Aug. 8, 2023

(54) METHODS AND APPARATUSES FOR LATENCY REDUCTION FOR URLLC

(71) Applicant: QUALCOMM incorporated, San Diego, CA (US)

(72) Inventors: Seyed Ali Akbar Fakoorian, San Diego, CA (US); Jing Sun, San Diego, CA (US); Xiaoxia Zhang, San Diego, CA (US); Chih-Hao Liu, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 16/746,415

(22) Filed: Jan. 17, 2020

(65) Prior Publication Data

US 2021/0226734 A1    Jul. 22, 2021

(51) Int. Cl.
| | |
|---|---|
| *H04L 1/18* | (2023.01) |
| *H04L 1/1812* | (2023.01) |
| *H04W 72/21* | (2023.01) |
| *H04W 72/23* | (2023.01) |

(52) U.S. Cl.
CPC .......... *H04L 1/1812* (2013.01); *H04W 72/21* (2023.01); *H04W 72/23* (2023.01)

(58) Field of Classification Search
CPC combination set(s) only.
See application file for complete search history.

(56) References Cited

U.S. PATENT DOCUMENTS

| | | | | |
|---|---|---|---|---|
| 10,306,630 | B2 * | 5/2019 | Yin | H04L 1/00 |
| 10,897,331 | B2 * | 1/2021 | Guan | H04L 5/0044 |
| 10,965,409 | B2 * | 3/2021 | Beale | H04L 25/0224 |
| 10,966,223 | B2 * | 3/2021 | Kundu | H04W 72/0446 |
| 2015/0049690 | A1 * | 2/2015 | Sambhwani | H04L 1/1671 370/329 |
| 2016/0323881 | A1 * | 11/2016 | Bhora | H04L 1/00 |
| 2017/0303248 | A1 * | 10/2017 | Chatterjee | H04W 72/042 |
| 2020/0083989 | A1 * | 3/2020 | Goktepe | H04W 72/044 |
| 2020/0107356 | A1 * | 4/2020 | Rico Alvarino | H04W 72/1284 |
| 2020/0266932 | A1 * | 8/2020 | Yang | H04L 1/1854 |
| 2020/0396759 | A1 * | 12/2020 | Baldemair | H04B 7/0413 |
| 2021/0050959 | A1 * | 2/2021 | Akkarakaran | H04L 1/1896 |

(Continued)

*Primary Examiner* — Hanh N Nguyen
(74) *Attorney, Agent, or Firm* — Holland & Hart LLP/Qualcomm Incorporated

(57) ABSTRACT

A method, an apparatus, a base station, and a user equipment (UE) for wireless communication are provided to reduce the retransmission latency for URLLC communications. Upon receiving a downlink data transmission, a UE waits until it completes decoding of the received downlink data transmission before it can send an ACK/NAK report on the decoded downlink data transmission. In case of a decoding failure, the base station cannot start retransmission until the UE finishes the decoding of the downlink data transmission and sends the ACK/NAK report and until the base station finishes decoding of an NAK in the ACK/NAK report. This considerable retransmission latency may not meet stringent latency requirements of some URLLC applications. A two-stage ACK/NAK reporting is disclosed to reduce the retransmission latency where the UE sends an early ACK/NAK report upon partially completing the decoding of the downlink data transmission.

21 Claims, 12 Drawing Sheets

(56) References Cited

U.S. PATENT DOCUMENTS

| | | | |
|---|---|---|---|
| 2021/0120579 A1* | 4/2021 | Park | H04W 72/14 |
| 2021/0307048 A1* | 9/2021 | Jiang | H04L 1/1887 |
| 2022/0109534 A1* | 4/2022 | Elshafie | H04L 5/0005 |

* cited by examiner

METHODS AND APPARATUSES FOR LATENCY REDUCTION FOR URLLC

BACKGROUND

Field

Aspects of the present disclosure generally relate to wireless communication, and more particularly to methods and apparatuses for latency reduction for ultra reliable low-latency communications (URLLC).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

One example of URLLC is wireless communication systems that may also include, or support networks used for vehicle-based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged.

Low latency requirements for systems such as a V2X is apparent due to the mission critical nature of the communications. Various mechanisms have been explored to reduce the latency of wireless communications.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

For URLLC communications, one delay inherent in the hybrid automatic repeat request (HARQ) ACK/NAK cycles is retransmission latency. Upon receiving a downlink data transmission, a UE waits until it completes decoding of the received downlink data transmission before it can send an ACK/NAK report on the decoded downlink data transmission. In case of a NAK in the ACK/NAK report, the base station then must retransmit the previously transmitted downlink data after receiving and decoding the NAK in the ACK/NAK report sent from the UE. This cycle of downlink data transmission—complete decoding of the downlink data—ACK/NAK report—retransmission by the base station, is inflexible and time consuming for URLLC communication, and may not meet low latency requirement of some applications such as the V2X applications mentioned above.

Thus, there is a need for a method, apparatus, and computer-readable medium at a user equipment (UE) for reducing the latency of the above HARQ ACK/NAK cycle by employing a two-stage ACK/NAK reporting. That is, the UE may send an early ACK/NAK after partially decoding the received downlink data transmission. Then the base station may start retransmission sooner than before, based on the early ACK/NAK report. The early ACK/NAK reporting may be followed by a regular ACK/NAK report when the UE completes decoding of the downlink data. This way, the retransmission latency may be reduced.

Thus, there is a need for a method, apparatus, and computer-readable medium at a base station for shortening the above HARQ ACK/NAK cycle by supporting the two-stage ACK/NAK reporting. That is, the base station may start re-transmitting the downlink data upon receiving an NAK in a received early ACK/NAK report, thus reducing the latency of retransmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
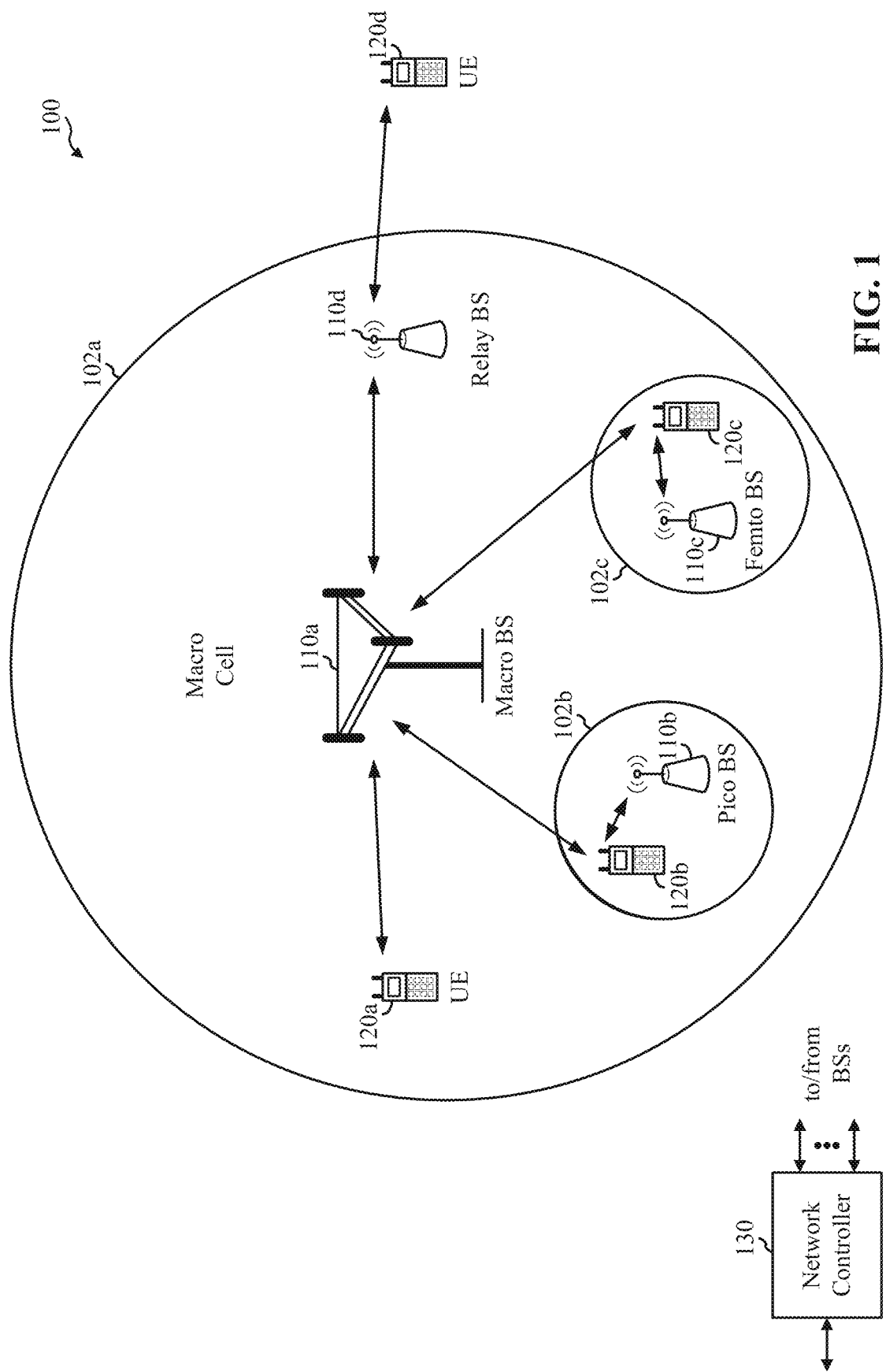
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize orthogonal frequency division multiplexing (OFDM) with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80-megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Various telecommunications standards employ a hybrid automatic repeat request (HARQ) protocol for repeating transmissions at a physical layer. While a HARQ protocol may reduce the time needed to correct transmission errors, the HARQ protocol may also consume battery power of a user equipment monitoring for repeated acknowledgments of data packets.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). A UE 120 such as an NB-IoT or eMTC UE 120 may remain in a dormant or idle state until a wakeup signal is received. The wakeup signal may indicate that a communication is scheduled for the UE 120. In some aspects, described elsewhere herein, UEs 120 may be grouped into UE groups, which may increase the efficiency of use of the wakeup signal.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 120s and base stations 110s may support retransmissions of data to increase the likelihood that data is received successfully. HARQ feedback is one technique of increasing the likelihood that data is received correctly over a communication link. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

As indicated above, FIG. 1 is provided merely as an example. Other examples are possible and may differ from what was described with regard to FIG. 1.

Figure 2:
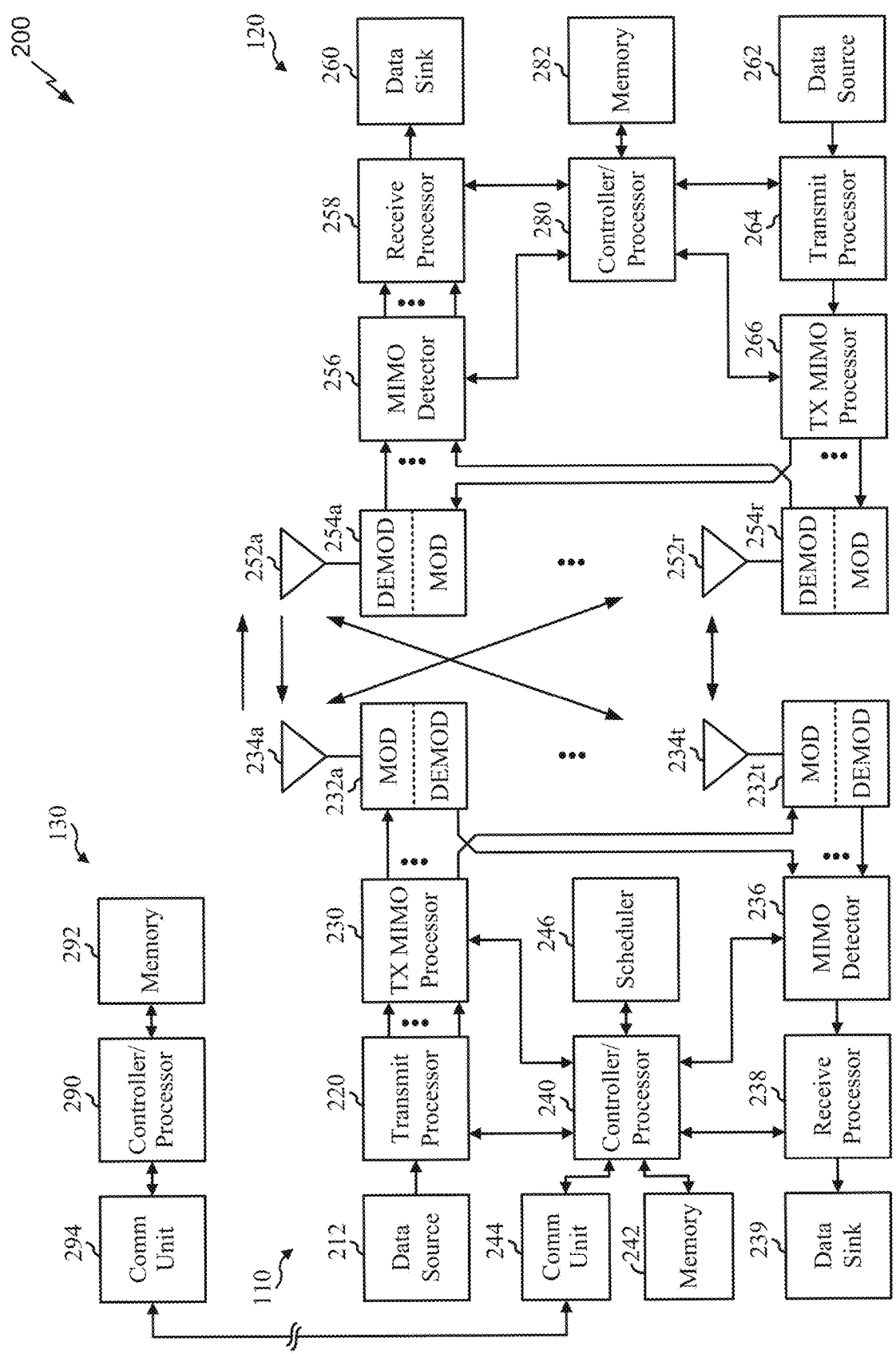
FIG. 2 is a diagram illustrating an example of a base station in communication with a UE in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), the narrowband reference signal (NRS)) and synchronization signals (e.g., the primary synchronization signal (PSS) and secondary synchronization signal (SSS), the narrowband PSS (NPSS) and narrowband SSS (NSSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, the channel processor may determine a reference value based at least in part on a wakeup signal, as described elsewhere herein.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform signaling related to wakeup signal resource allocation. For example, controller/processor 240 of BS 110, controller/processor 280 of UE 120, and/or any other component(s) of FIG. 2 may perform or direct operations of, for example, method 700 of FIG. 7, method 800 of FIG. 8, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
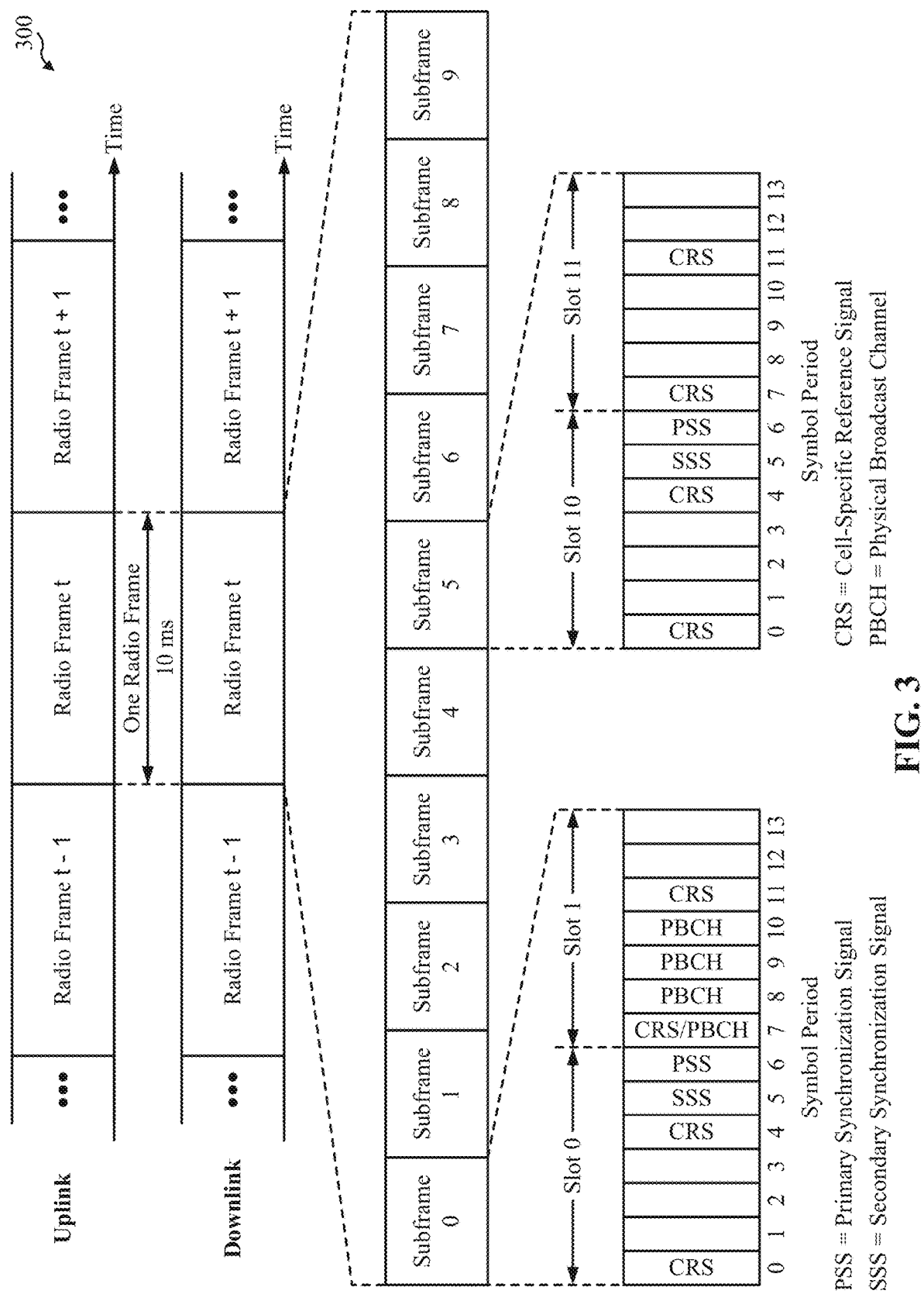
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. This cyclic prefix may be included in a preamble that may identify whether a communication is associated with a particular UE (e.g., based at least in part on a UE group identifier and/or a cell identifier associated with the particular UE). The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBS) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as 5G systems), a Node B may transmit these or other signals in these locations or in different locations of the subframe. For an example of such a subframe structure, refer to the appendix attached hereto.

As indicated above, FIG. 3 is provided merely as an example. Other examples are possible and may differ from what was described with regard to FIG. 3.

The present disclosure may involve various aspects of 5G RN. In particular, HARQ ACK/NAK related aspects, including downlink signaling channels include physical downlink control channel (PDCCH), physical downlink shared channel (PDSCH), and physical uplink control channel (PUCCH) may be described from different perspectives in different context. In the present disclosure, different terms may be used to convey same or similar meanings. For example, the more generic term downlink data transmission and the more specific term PDSCH may be used interchangeably. For another example, the more generic term downlink control channel/signaling and the more specific term PDCCH may be used interchangeably in some cases.

Figure 4:
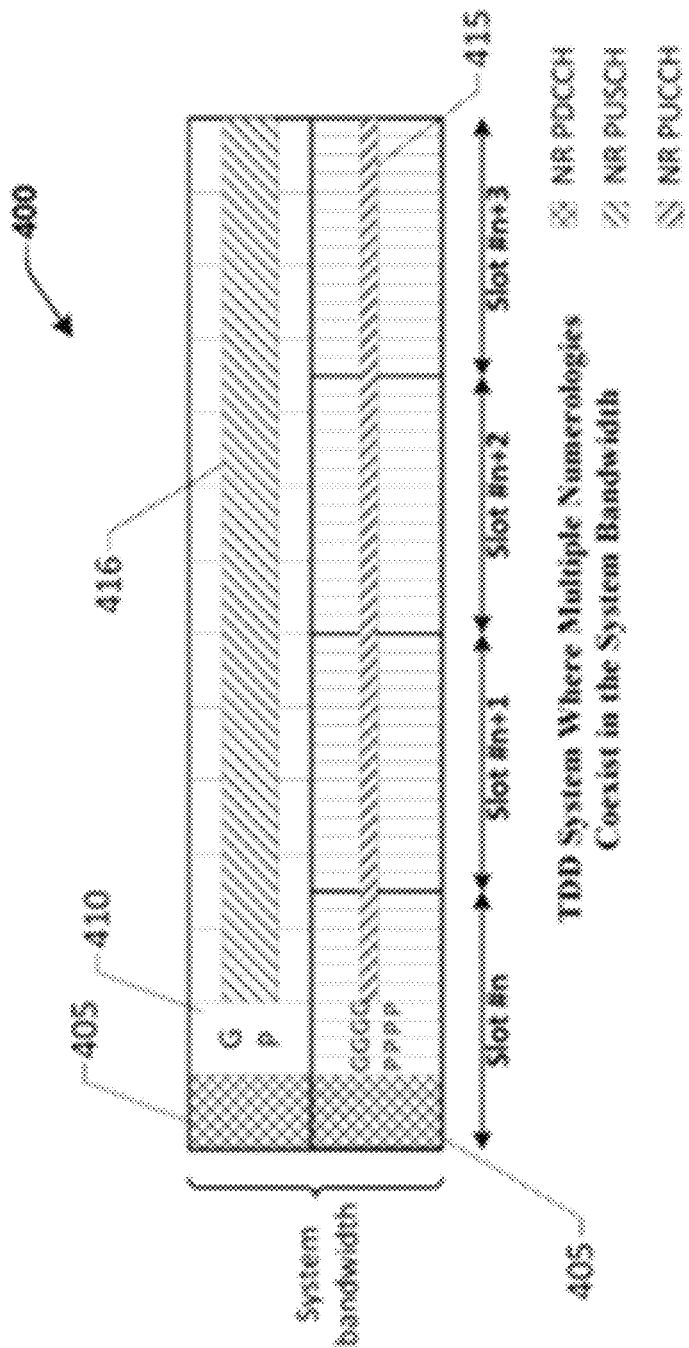
FIG. 4 shows a diagram for an example NR PUCCH in relation to NR PDCCH and NR PUSCH resource allocation in accordance with aspects of the present disclosure.

FIG. 4 shows a diagram 400 for an example resource allocation for an NR PUCCH, an NR PDCCH and an NR PUSCH in a TDD system. The diagram 400 shows a system bandwidth of aggregated time slots, which includes an NR PDCCH 405, guard periods (GP) 410, an NR PUCCH 415, and an NR PUSCH 416 in a TDD system, where multiple numerologies coexist in the system bandwidth.

As shown in FIG. 4, multiple numerologies coexist in the same system bandwidth in a frequency division multiplexing (FDM) manner, and the UL portion may be aligned for the different numerologies. As shown in FIG. 4, the DL, guard period and UL regions are aligned between different numerologies within the same system bandwidth. In embodiments where resources of an NR TDD frame are multiplexed in frequency, when the size of DL control region PDCCH 405 and the duration of the guard period 410 are known and reference numerologies being aligned in time, the UE may derive the durations of PUCCH 415, and uplink data channel PUSCH 416 even when larger subcarrier spacing is applied in the same frame.

In one example aspect, the duration of UL control channel PUCCH 415 including starting and/or end symbol within aggregated slots may be configured by higher layers or indicated in the downlink control information (DCI) of PDCCH 405. To reduce signaling overhead, given that UL control channel PUCCH 415 may be transmitted in consecutive symbols, the starting symbols and/or starting slot within aggregated slots for the UL control channels PUCCH 415, and PUSCH 416 may be signaled by the gNB.

As indicated above, FIG. 4 is provided merely as an example. Other examples are possible and may differ from what was described with regard to FIG. 4.

Figure 5:
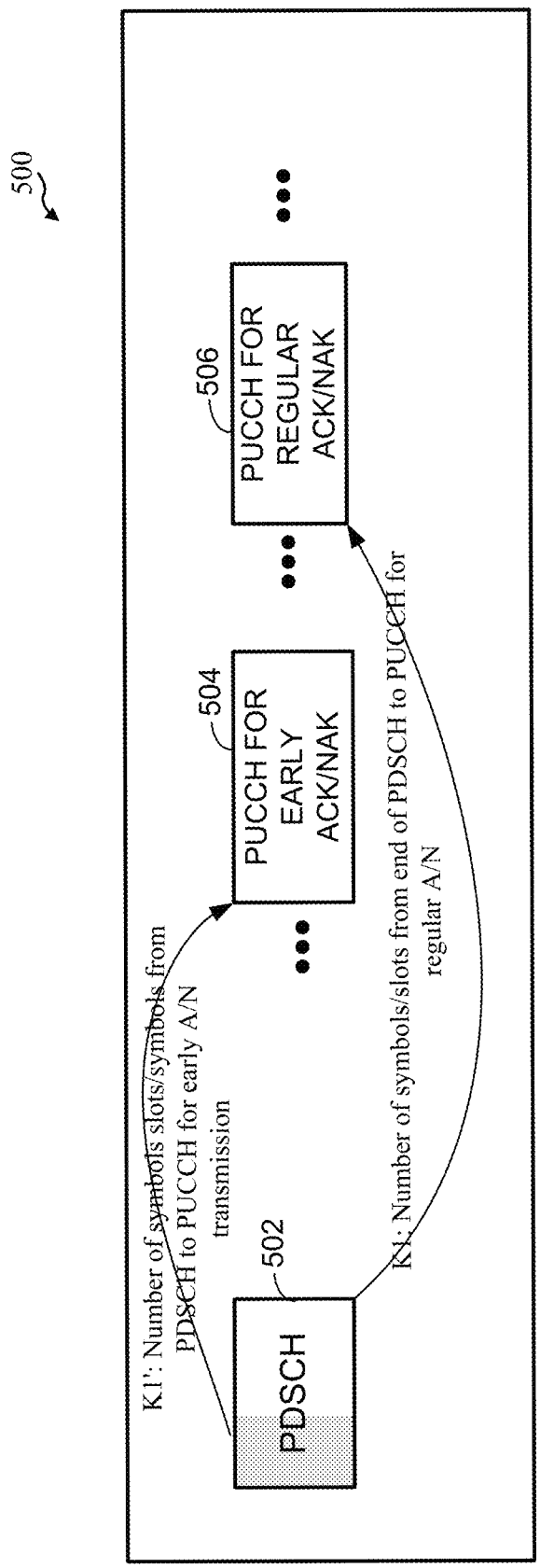
FIG. 5 is a diagram illustrating PUCCH resources for a two-stage ACK/NAK reporting, in accordance with aspects of the present disclosure.

FIG. 5 is a diagram illustrating an example 500 of PUCCH resources for a two-stage ACK/NAK reporting, in accordance with aspects of the present disclosure. A PUCCH may be used by a UE to send various status information and reports to a base station, including ACK/NAK report on a received downlink data transmission, among others.

The example 500 includes a PDSCH 502 which is mainly used to carry downlink data transmission. After a PDSCH 502 is transmitted by the base station to the UE, the UE is scheduled to report back to the based station the status of received PDSCH, i.e., whether or not the PDSCH has been successfully decoded. In the conventional approach, the UE, after an interval of K symbols or slots and upon completing decoding of the received PDSCH, the UE uses the PUCCH 506 to send a regular ACK/NAK report on the received PDSCH to the base station. The current disclosure presents a two-stage ACK/NAK reporting scheme, in which the UE sends an early ACK/NAK report on PUCCH 504 after an interval of K1' symbols or slots and upon only partially decoding the received PDSCH.

As indicated in FIG. 5, K1 represents the number of symbols or slots between the receiving of the PDSCH and the transmission of PUCCH 506 for regular ACK/NAK and K1' the number of symbols or slots between the receiving of PDSCH and transmission of PUCCH 504 for early ACK/NAK. The parameters K1 and K1' may be configurable, depending on the UE capabilities and the subcarrier spacing of the system. Similarly, the gap between the PUCCH 504 for early ACK/NAK and PUCCH 506 for regular ACK/NAK may also depend on the UE capabilities, the subcarrier spacing and the HARQ processing time of the system.

The ACK/NAK is also referred to as HARQ ACK/NAK. HARQ ACK/NAK cycle is related to HARQ processing time. In one example embodiment, a 5G UE may support a set of minimum HARQ processing time. A 5G gNB may also support different minimum HARQ processing times at least for across UEs. The HARQ processing time at least includes delay between DL data reception timing to the corresponding HARQ-ACK transmission timing and delay between UL grant reception timing to the corresponding UL data transmission timing. In one embodiment, the UE is required to indicate its capability of minimum HARQ processing time to gNB. In another embodiment, asynchronous and adaptive DL HARQ is supported at least for service such as eMBB and URLLC.

As indicated above, FIG. 5 is provided merely as an example. Other examples are possible and may differ from what was described with regard to FIG. 5 but are still within the spirit of the current disclosure.

Figure 6:
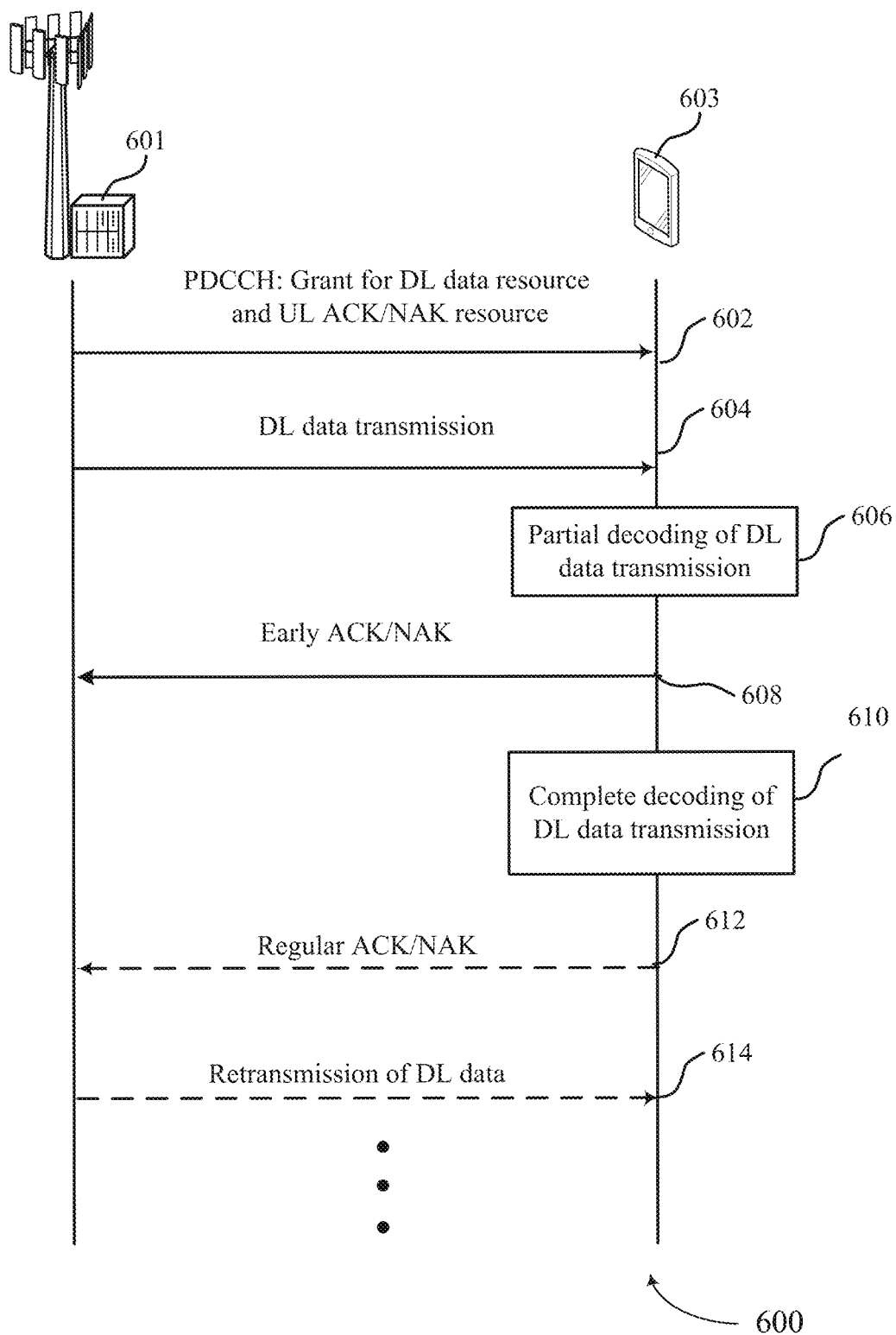
FIG. 6 is a diagram illustrating example message exchanges related to early and regular acknowledgement/negative acknowledgements between a 5G base station and a UE, in accordance with aspects of the present disclosure.

FIG. 6 is a diagram illustrating example message flow 600 between a 5G base station and a UE, in accordance with aspects of the present disclosure. The message flow 600 illustrates messages exchange for a two-stage ACK/NAK reporting. The base station 601 may be a 5G gNB and the UE 603 may be a 5G-capable UE capable of supporting the two-stage ACK/NAK reporting. A dotted line indicates the associated step may be optional.

At 602, the base station 601 transmits a grant for the ACK/NAK resource for the UE 603 to send ACK/NAK reports. The grant may be carried in a downlink control channel such as a PDCCH. The base station 601 may use the PDCCH to configure two resources, one for the early ACK/NAK and one for the regular ACK/NAK.

At 604, the gNB 601 sends downlink data to the UE 603. In one example aspect, the downlink data is sent view a physical downlink shared channel (PDSCH). The downlink resource for the UE to receive the downlink data transmission may be allocated by the gNB 601 in the prior downlink control message carried on the PDCCH. In one example aspect, a downlink control channel such as the PDCCH may come together with the received PDSCH and PDCCH may take up a first few symbols or slots of the received PDSCH.

At 606, the UE 603 starts decoding the received downlink data transmission. In conventional scheme, the UE does not send any ACK/NAK report until it completes decoding of the received PDSCH. Instead, at 606, the UE 603 may decide to send an an ACK/NAK upon partially completing decoding of the received PDSCH. Thus, the ACK/NAK is termed the early ACK/NAK to distinguish from the regular ACK/NAK. As to how much of the received PDSCH is decoded before the UE 603 determines to send the early ACK/NAK depends on various factors and will be discussed in detail later.

At 608, the UE 603 sends the early ACK/NAK upon partially completing decoding of the received downlink data transmission. The early ACK/NAK indicates a success or failure of partial decoding of the received PDSCH. In some cases, the early ACK/NAK provides sufficient information for the gNB 601 to determine whether a retransmission of the PDSCH is needed without waiting for the decoding of the entire PDSCH. Thus, the latency for the response from the UE 603 to the base station is reduced and so is the retransmission latency.

At 610, after sending the early ACK/NAK, the UE 603 continues on and completes decoding of the remaining part of the received PDSCH. The result of decoding of the remaining part of received PDSCH may be consistent with or contradict the results of early partial decoding of the received PDSCH.

At 612, based on the result of decoding the remaining part of the received PDSCH, the UE 603 may send a regular ACK/NAK, as in conventional scheme where the ACK/NAK is sent upon completing decoding of the entire PDSCH. In some example aspect, if the result of the remaining part decoding is consistent with the result of partial decoding, the regular ACK/NAK may be avoided. For example, if the early ACK/NAK is a NAK, meaning that the partial decoding of received PDSCH failed. The gNB 601 already determined to retransmit the PDSCH. In this case, the UE 603 may skip or avoid sending the regular ACK/NAK.

At 614, the gNB may retransmit the PDSCH if either the early ACK/NAK or the regular ACK/NAK, or both indicate a NAK. As indicated above, if either the early ACK/NAK or the regular ACK/NAK or both indicate a positive ACK, the step of retransmission of the PDSCH is skipped.

As indicated above, FIG. 6 is provided merely as an example. Other examples are possible and may differ from what was described with regard to FIG. 6 but are still within the spirit of the current disclosure.

Figure 7:
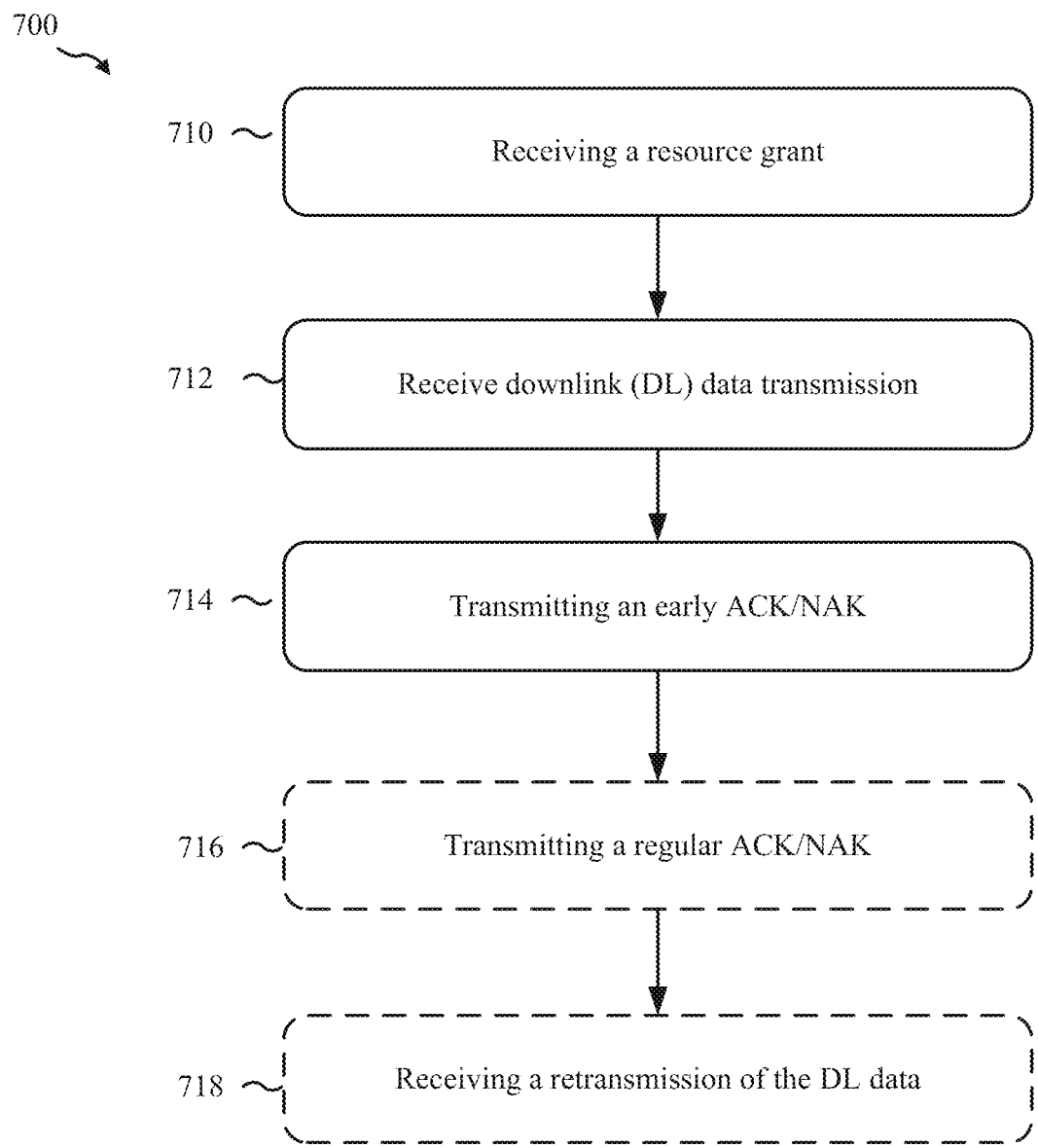
FIG. 7 is a flow chart illustrating a method of wireless communication in accordance with various aspects of the present disclosure.

FIG. 7 is a flow chart illustrating a method 700 of wireless communication in accordance with various aspects of the present disclosure. The method 700 implements a two-stage ACK/NAK reporting from the UE to a gNB, including an early ACK/NAK reporting followed by a regular ACK/NAK reporting, as described above. The method 700 may be performed by a UE such as the UE 603 of FIG. 6 or any of the UE 120s of FIG. 1. The optional steps are indicated in dotted lines.

In conventional approach, a UE does not send any ACK/NAK report until it completes decoding of the received PDSCH. Instead, according to the method 700, the UE may decide to send an ACK/NAK upon partially completing decoding of the received downlink data transmission. Thus, the ACK/NAK is referred to as the early ACK/NAK in contrast with the regular ACK/NAK which is sent upon completing the decoding of the received PDSCH.

At 710, the method 700 includes receiving an ACK/NAK resource grant. The UE may receive a grant from the serving gNB to configure two resources, one for the early ACK/NAK and one for the regular ACK/NAK. There may be two alternative ways for the UE to receive grants for the AKC/NAK resources. One is through the dynamic signaling such as signaling with a PDCCH. The other is through a signaling message such as an RRC signaling message to preconfigure the ACK/NAK resources prior to establishment of a session between the UE and the gNB.

In one embodiment, both the early ACK/NAK resource and regular ACK/NAK resource are configured via PDCCH. One advantageous effect of this approach is the flexibility of resource allocation for both the early ACK/NAK and regular ACK/NAK. For example, the early ACK/NAK resource is configured at one location for one PDSCH and may be at a different location for next PDSCH, depending on dynamic status of resource allocation.

In an alternative embodiment, the early ACK/NAK may be preconfigured via a an RRC configuration message prior to setup of a session between the gNB and the UE. One advantageous effect of this approach is the reduction of run-time signaling overhead such as signaling for dynamic configuration of the early ACK/NAK resource via dynamic PDCCH signaling. In this approach, the regular ACK/NAK resource may still be configured via dynamic PDCCH signaling.

In another example alternative embodiment, a combination of the dynamic PDCCH signaling and RRC-based semi-static signaling for ACK/NAK resource allocation may be used. For example, the frequency location of the early ACK/NAK resource may be shared with the regular ACK/NAK resource that is sent to the UE via dynamic PDCCH signaling while a time offset for the early ACK/NAK may be preconfigured via an RRC signaling message.

An ACK/NACK report is used to indicate whether a downlink data transmission, or PDSCH has been successfully received and decoded. It may happen that an early ACK/NAK resource for one PDSCH may overlap with the regular ACK/NAK resource for another PDSCH. One approach to address this resource overlapping or contention issue is to allow multiplexing of early ACK/NAK resource and the regular ACK/NAK for another PDSCH. In this approach, the base station would then go through a demultiplexing step to receive a correct ACK/NAK report.

An alternative approach to this ACK/NAK resource overlapping issue is to drop the ACK/NAK with larger delay budget, because the ACK/NAK with larger delay budget is more tolerant to the delay. For example, according to this approach, a regular ACK/NAK for a PDSCH for enhanced mobile broadband (eMBB) or other less latency sensitive service may be dropped in favor of an early ACK/NAK for a more latency sensitive service.

In one example aspect, the two-stage ACK/NAK reporting may result in that a more conservative or larger K1 value be used. As discussed above, K1 represents the number of slots or symbols between PDSCH and the PUCCH for an early ACK/NAK, as indicated in FIG. 5. In one example aspect, to increase reliability of early ACK/NAK reporting, multiple resources may be configured by the gNB for the early ACK/NAK reporting. The multiple resources may be in different bandwidth parts, channels or component carriers to reduce the likelihood of early ACK/NAK report failure.

At 712, the method 700 includes receiving a downlink data transmission or a PDSCH. The downlink resource for the UE to receive the downlink data transmission may be configured by the gNB with dynamic PDCCH signaling. In one example aspect, a downlink control channel such as a PDCCH comes together with the received PDSCH and the PDCCH may take up a first few symbols or slots of the received PDSCH.

At 714, the method 700 includes transmitting an early ACK/NAK upon partially decoding the received PDSCH. In one example embodiment, the UE includes in the early ACK/NAK only a NAK and may implicitly indicate an ACK by an absence of an NAK. This may enable the receiving gNB to commit to an early retransmission of the PDSCH if an explicit NAK is decoded. One advantageous effect of this approach includes reducing the UE power consumption by avoiding explicitly encoding ACKs, in particular considering there are more ACKs than NAKs in normal situations.

In another example embodiment, the UE may transmit an explicit ACK. A NAK is implied by a lack of ACK. This may enable the receiving gNB to commit to an early retransmission of the PDSCH once an implied NAK is received, even if the UE may have missed the previous PDCCH or the quality of the received PDSCH is poor.

In yet another example embodiment, the UE may explicitly encode and transmit both ACK or NAK in the early ACK/NAK report. This approach may result in least ambiguity in particular when the base station does not receive any ACK/NAK report from the UE on a previous PDCCH.

At what point in the decoding process does the UE may determine to transmit the early ACK/NAK report? This may depend on various factors. In one example aspect, the UE may use various thresholds to determine when to send the early ACK/NAK report. For example, when a predetermined percentage of the received PDSCH, say, 30%, the UE may determine to transmit an early ACK/NAK. In another example aspect, when a certain threshold of successful or unsuccessful symbols that have been decoded is met, the UE determines the content of the early ACK/NAK report to be an ACK or NAK.

When the UE sends the early ACK/NAK upon partially completing decoding of the received downlink data transmission, the early ACK/NAK indicates a success or failure of decoding of the partial received data. In some cases, the early ACK/NAK provides sufficient information for the receiving gNB to determine and commit to a retransmission of the downlink data without waiting for the decoding of the entire PDSCH. Thus, the latency for the response from the UE to the base station is reduced and retransmission is faster. The overall latency is reduced, as well.

At 716, the method 700 includes transmitting a regular ACK/NAK. After sending the early ACK/NAK, the UE continues on and completes decoding of the remaining part of the received PDSCH. The result of decoding of the remaining part of received PDSCH may be consistent with or contradict the results of early partial decoding of the received PDSCH. Based on the result of decoding the remaining part of the received PDSCH, the UE may send a regular ACK/NAK, as in conventional case where the regular ACK/NAK is sent upon complete decoding of the received PDSCH.

In one example aspect, the UE may choose to skip sending the regular ACK/NAK if the early ACK/NAK report is a NAK. Additionally, if the result of the remaining part decoding is consistent with the result of partial decoding, the regular ACK/NAK may be avoided. For example, if the early ACK/NAK is a NAK, meaning that the partial decoding of received PDSCH failed. The receiving gNB already committed to retransmission of the downlink data. In this case, the UE may skip or avoid sending the regular ACK/NAK, at least to save some transmission resource and UE battery power.

In one example aspect, if the early ACK/NAK report is an ACK and the regular ACK/NAK report is also an ACK, the UE may skip transmission of the regular ACK/NAK. However, if the regular ACK/NAK report is a NAK and the early ACK/NAK report is an ACK, the UE will send the regular ACK/NAK report.

In another example aspect, an option that only the early ACK/NAK resource is configured and no resource for regular ACK/NAK is allocated may be considered when resource constrain is a concern. That is, the regular ACK/NAK report is dropped altogether. In this case, if the early ACK/NAK report and the would-be regular ACK/NAK report are consistent, the would-be regular ACK/NAK would be redundant and the resource for the regular ACK/NAK and the power for transmitting the regular ACK/NAK have been saved.

However, if the early ACK/NAK report and the would-be regular ACK/NAK report are not consistent, some error condition may occur. For example, if the early ACK/NAK report is an NAK but the would-be regular ACK/NAK report is an ACK, a retransmission is wasted. The worst scenario is that if the early ACK/NAK report is an ACK but the would-be regular ACK/NAK report is an NAK, then a would-be retransmission is missed. An upper later protocol such as radio link control (RLC) protocol may detect the missing data and initiate retransmission later. Thus, the option of only the early ACK/NAK resource being configured may be considered only when the probability for the situation that the early ACK/NAK report and the would-be regular ACK/NAK report are inconsistent, is fairly low, in particular, when the chance for the early ACK/NAK report being an ACK but the would-be regular ACK/NAK report being an NAK is fairly low.

At 718, the method 700 may include receiving a retransmission of the PDSCH. The UE may receive the retransmission in response to transmitting a NAK in either the early ACK/NAK report or the regular ACK/NAK report.

In one example embodiment, the retransmission of the PUSCH includes a new signaling channel such as a PDCCH. If a PDCCH is included in the retransmission, the retransmitted PDCCH is viewed as a new PDCCH and overwrites the contents of the PDCCH for the failed PDSCH of the original HARQ process.

In another example aspect, the retransmission of the PUSCH does not include a PDCCH. In this case, the PDCCH for the original transmission may be used. The parameter such as K1 from the original PDCCH may be applied to the retransmitted PDSCH. In another example aspect, the K1 parameter may be applied to the original PDSCH, indicating that no change in the PUCCH resource as originally configured in the initial PDCCH.

In some aspect, the UE may use the early ACK/NAK report to implicitly indicate whether a previous PDCCH has been successfully received and decoded. For example, if the UE sends an NAK in the early ACK/NAK report using PUCCH resources configured with a PDCCH, the UE implicitly indicates to the receiving gNB that the PDCCH has been successfully decoded. As a result, the original or a new PDCCH may be dropped in the retransmission of the PDSCH.

Not including a PDCCH in the retransmission can have some advantageous effects, such as saving retransmission resource and power for retransmission. In one example aspect, the UE may be preconfigured with PDSCH resource for retransmission via RRC signaling. This way, there may not be such a need to include a PDCCH in the retransmission of the PDSCH. In another example aspect, the UE may be partially preconfigured with the PDSCH retransmission resource to avoid the retransmission of PDCCH. In one example aspect, a resource block location may come from a most recent successfully decoded PDCCH while s resource time offset may be preconfigured via RRC signaling. For example, no symbols are allocated for retransmission after the early ACK/NAK resource.

The method 700 is for illustration purpose and shows one possible process for a UE to perform the two-stage ACK/NAK reporting. In practice, one or more steps shown in illustrative flowchart for the method 700 may be combined with other steps, performed in any suitable order, performed in parallel (e.g., simultaneously or substantially simultaneously), or removed.

Figure 8:
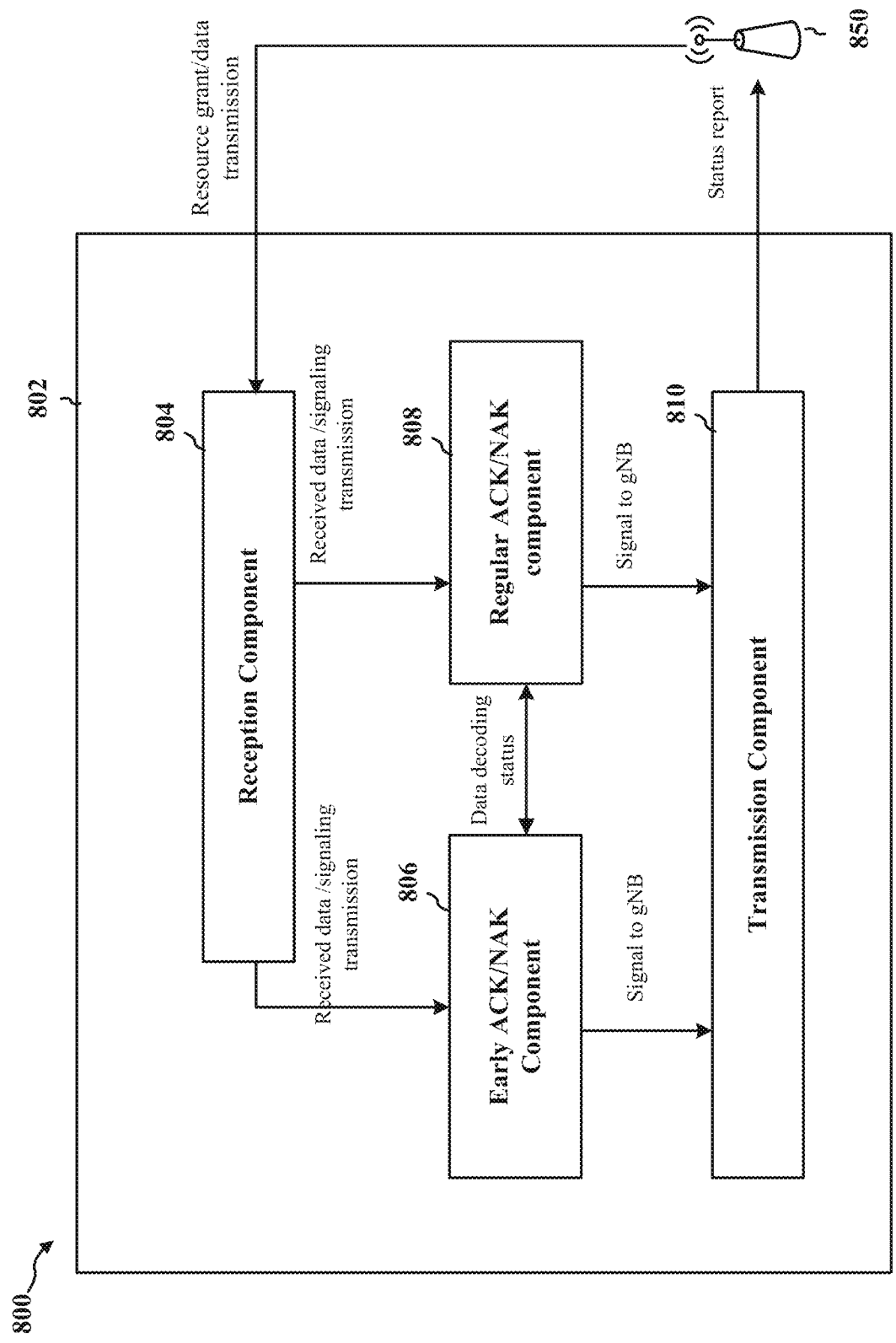
FIG. 8 is a conceptual data flow diagram illustrating the data flow between different modules/means/components in an example apparatus in accordance with one or more aspects of the present disclosure.

FIG. 8 is a conceptual data flow diagram 800 illustrating the data flow between different modules/means/components in an example apparatus 802. The apparatus 802 may be a UE, such as 5G-capable UE 120s of FIG. 1 or UE 603 of FIG. 6, and/or the like. In some aspects, the apparatus 802 includes a reception component/module 804. The reception component 804 may receive transmissions from a gNB 850 (e.g., the UE 120 and/or the like). In some aspects, the transmission may include data transmissions and various control signaling message from a gNB, ACK/NAK resource grants, and/or retransmission of a previous data transmission.

The apparatus 802 also includes an early ACK/NAK component 806 that may generate an early ACK/NAK report upon partially decoding a received downlink data channel received from the reception component 804. The apparatus 802 also includes a regular ACK/NAK component/module 808 that may determine and generate a regular ACK/NAK report upon complete decoding of the received downlink data transmission received from the reception component 804. The apparatus 802 further includes the transmission component 810 that may transmit the generated early ACK/NAK report and the regular ACK/NAK report.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
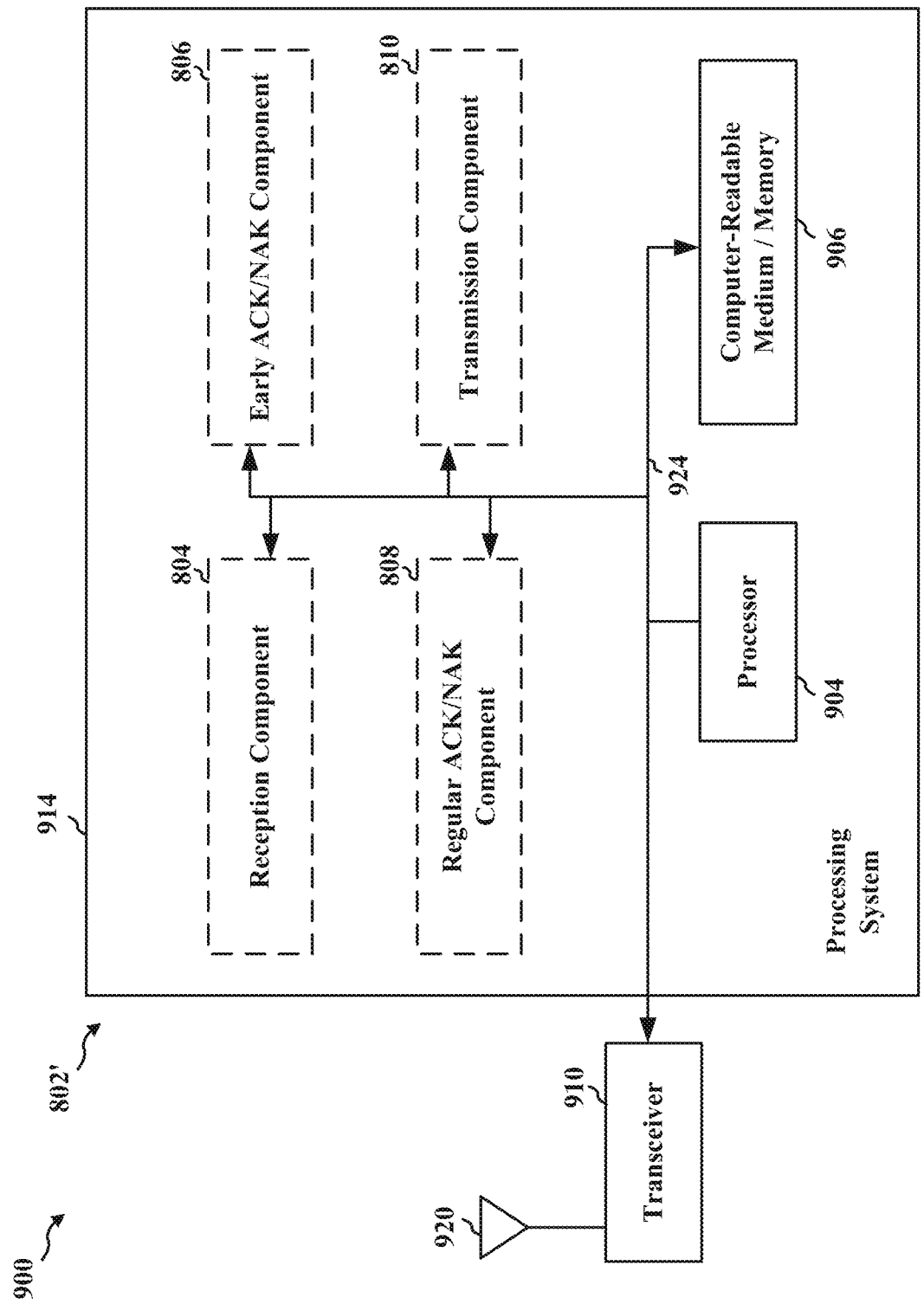
FIG. 9 is a diagram illustrating an example of a hardware implementation for an apparatus employing a processing system in accordance with one or more aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the transmission component 910. In addition, the transceiver 910 receives information from the processing system 914, specifically the reception component 804, and based on the received information, generates a signal to be applied to the one or more antennas 920.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer readable medium/memory 906, one or more hardware components coupled to the processor 904, or some combination thereof.

Figure 10:
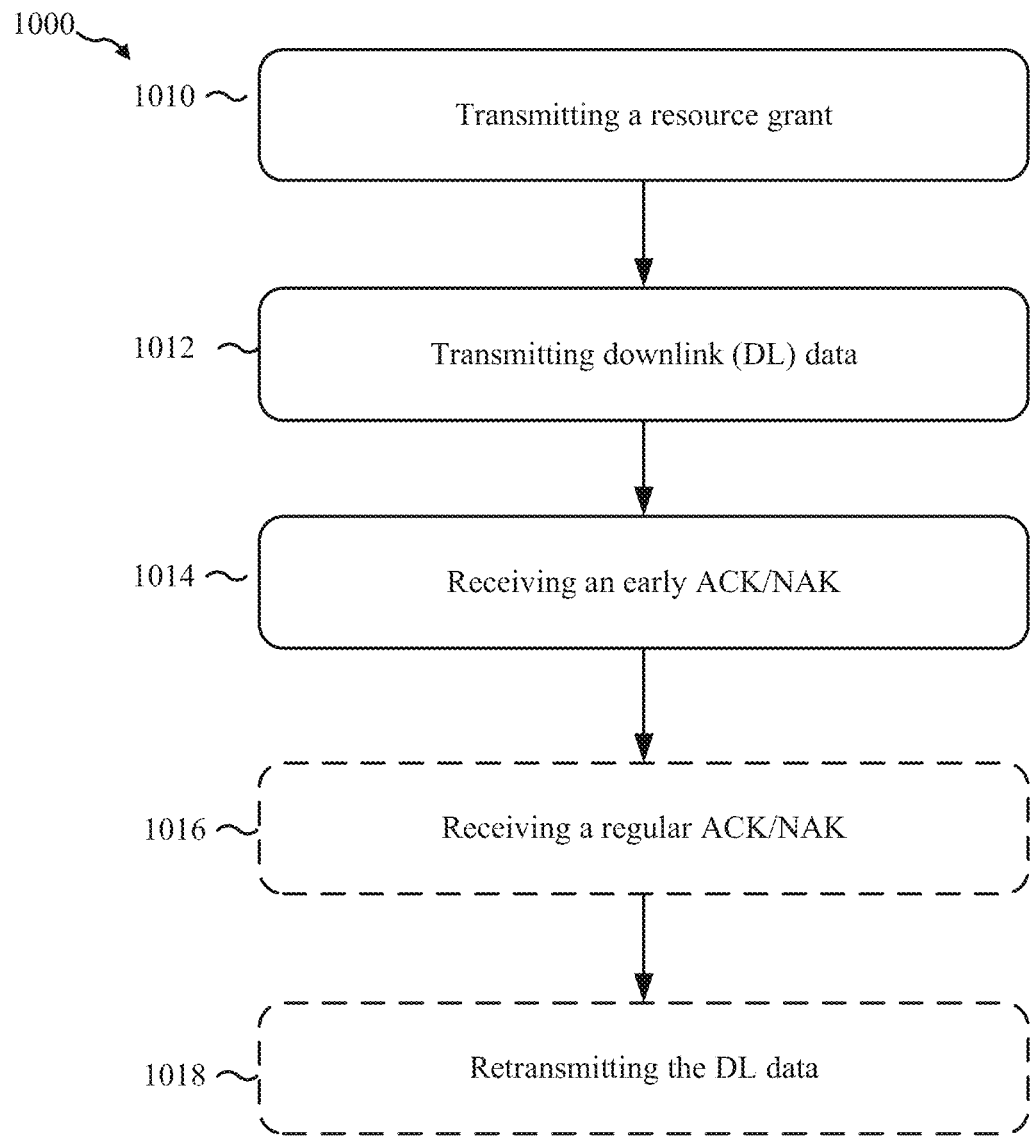
FIG. 10 is a flow chart illustrating a method of wireless communication in accordance with one or more aspects of the present disclosure.

FIG. 10 is a flow chart illustrating a method 1000 of wireless communication in accordance with various aspects of the present disclosure. The method 1000 implements a two-stage ACK/NAK reporting from the UE to a base station, including an early ACK/NAK reporting followed by a regular ACK/NAK reporting. The method 1000 may be performed by a base station such as the gNB 601 of FIG. 6 or any of the base station 110s of FIG. 1. The optional steps are indicated in dotted lines.

In the conventional approach, the base station does not receive any ACK/NAK report until the UE completes decoding of a received downlink data transmission/PDSCH. According to the method 1000, the base station may receive an early ACK/NAK when the UE only partially decoded the received downlink data transmission. Thus, the ACK/NAK is termed early ACK/NAK in contrast with the regular ACK/NAK which is received from the UE after the UE completes the decoding of the received downlink data transmission/PDSCH.

At 1010, the method 1000 includes transmitting an ACK/NAK resource grant. The base station may send the grant to the UE to configure two resources, one for early ACK/NAK report and one for regular ACK/NAK report. There may be two alternative ways for the base station to send the grant for the AKC/NAK resources. One is through the dynamic signaling such as a PDCCH signaling. The other way is through a semi-static signaling message such as an RRC configuration message to preconfigure the ACK/NAK resources prior to establishment of a session between the UE and the gNB.

In one embodiment, both the early ACK/NAK resource and regular ACK/NAK resource are dynamically configured via PDCCH. One advantageous effect of this approach is the flexibility of resource allocation for both the early ACK/NAK and regular ACK/NAK. For example, the early ACK/NAK resource is configured at one location for one PDSCH and may be at a different location for next PDSCH, depending on dynamic status of resource allocation.

In an alternative embodiment, the early ACK/NAK may be preconfigured via an RRC configuration message prior to a session between the base station and the UE is established. One advantageous effect of this approach is the reduction of run-time signaling overhead such as signaling for dynamic configuration of the early ACK/NAK resource via PDCCH. In this approach, the regular ACK/NAK resource may still be dynamically configured via a PDCCH.

In another example alternative embodiment, a combination of the PDCCH-based approach and RRC-based approach to ACK/NAK resource configuration may be employed. For example, the frequency location of the early ACK/NAK resource may be shared with the regular ACK/NAK resource that is sent to the UE via PDCCH while a time offset for the early ACK/NAK may be preconfigured via an RRC configuration message.

An ACK/NACK report is to indicate whether a downlink data transmission, or PDSCH has been successfully received and decoded by the UE. It may happen that an early ACK/NAK resource for one PDSCH may overlap with the regular ACK/NAK resource for another PDSCH. One approach to address this resource overlapping or contention issue is for the UE to multiplex the early ACK/NAK report with the regular ACK/NAK report for the other PDSCH. In this approach, the base station would then go through a demultiplexing step to know the early ACK/NAK report.

An alternative approach to this resource contention issue is for the UE to drop the ACK/NAK report with a larger delay budget for this reporting cycle, because the ACK/NAK with a larger delay budget is more tolerant to the delay. For example, according to this approach, a regular ACK/NAK for enhanced mobile broadband (eMBB) or other less latency sensitive service may be dropped in favor of an early ACK/NAK for a more latency sensitive service such as an URLLC application. In this case, the base station would receive only one ACK/NAK report for the PDSCH with smaller delay budget.

To increase reliability of early ACK/NAK reporting, in one example aspect, the base station may configure multiple resources for early ACK/NAK reporting. The multiple resources may be in different bandwidth parts, channels or component carriers to reduce the likelihood of an early ACK/NAK report failure.

At 1012, the method 1000 includes transmitting a PDSCH to the UE. The downlink resource for the UE to receive the downlink data transmission/PDSCH may be allocated by the base station in a downlink control channel such as PDCCH. In one example aspect, a downlink control channel such as a PDCCH may go together with the PDSCH to the UE and the PDCCH may take up a first few symbols or slots of the PDSCH.

At 1014, the method 1000 includes receiving an early ACK/NAK from the UE after the UE partially decoded the received downlink data transmission or PDSCH. The base station has the knowledge of the duration for the UE to complete the decoding of the entire PDSCH. The base station knows it has received an early ACK/NAK report rather than a regular ACK/NAK report based on whether the duration or the time period for the UE to complete the decoding of the PDSCH has expired.

In one example embodiment, the base station may receive in the early ACK/NAK an explicit NAK and an implicit ACK via an absence of an explicit NAK. This may enable the base station to commit to an early retransmission of the downlink data once the explicit NAK is decoded. One advantageous effect of this approach includes reducing the UE power consumption by avoiding explicitly encoding ACKs, in particular considering there are more ACKs than NAKs in normal situations.

In another example embodiment, the base station may receive an explicit ACK and an implicit NAK in the early ACK/NAK report. A NAK is implied by a lack of an explicit ACK. This may also enable the base station to commit to an early retransmission of the downlink data/PDSCH once the implied NAK is successfully decoded.

In yet another example embodiment, the base station may receive either explicit ACK or an explicit NAK in the early ACK/NAK report. This approach may result in least ambiguity in particular when the PDCCH is successfully decoded by the UE, but the base station fails to receive any indication regarding the status of the previous PDCCH. A potential downside of this approach is power consumption by the UE to encode explicit ACKs and NAKs.

When the base station receives the early ACK/NAK after the UE partially decoded the downlink data transmission, the early ACK/NAK indicates a success or failure of decoding of the partial PDSCH. In some cases, the early ACK/NAK provides sufficient information for the base station to determine and commit to a retransmission of the PDSCH without waiting for the decoding of the entire PDSCH. Thus, the latency for the response from the UE to the base station is reduced and retransmission by the base station is faster. As a result, the overall latency is reduced.

At 1016, the method 1000 includes receiving a regular ACK/NAK. After sending the early ACK/NAK to the base station, the UE may continue on and complete decoding of the remaining part of the received PDSCH. The received regular ACK/NAK report indicates the status of the decoding of the remaining part of the PDSCH and may be consistent with or contradict the early ACK/NAK report.

In one example aspect, the base station may not expect to receive any regular ACK/NAK if the early ACK/NAK report is a NAK. Additionally, if the regular ACK/NAK is consistent with the received early ACK/NAK report, the base station would not receive the regular ACK/NAK either. For example, if the early ACK/NAK is a NAK, meaning that the partial decoding of received PDSCH failed. The base station already committed to retransmission of the PDSCH. In this case, the base station does not expect to receive the regular ACK/NAK report because the UE would skip or avoid sending the regular ACK/NAK, at least to save some transmission resource and UE battery power.

In one example aspect, if the early ACK/NAK report is an ACK and the regular ACK/NAK report is also an ACT, the base station does not expect to receive the regular ACK/NAK report either because the UE may also skip transmission of the regular ACK/NAK. However, if the regular ACK/NAK report is a NAK and the early ACK/NAK report is an ACT, the base station would expect to receive the regular ACK/NAK report.

In another example aspect, an option that only the early ACK/NAK resource is configured and no resource for regular ACK/NAK is allocated may be considered when resource constrain is an issue. That is, the regular ACK/NAK report may be skipped all together. In this case, if the early ACK/NAK report and the would-be regular ACK/NAK report are consistent, the regular ACK/NAK would be redundant and the resource for the regular ACK/NAK and the power for transmitted the regular ACK/NAK have been saved.

However, if the early ACK/NAK report and the would-be regular ACK/NAK report are not consistent, some error condition may occur. For example, if the early ACK/NAK report is an NAK but the would-be regular ACK/NAK report is an ACK, the base station commits to an early retransmission and the retransmission is wasted. If the early ACK/NAK report is an ACK but the would-be regular ACK/NAK report is an NAK, the base station would not know a need for retransmission and the UE would miss a retransmission if the regular ACK/NAK report is skipped all together. An upper later protocol such as radio link control (RLC) protocol may detect the missing data and initiate retransmission later. Accordingly, the option of skipping the regular ACK/NAK report all together may be considered only when the probability for the situation that the early ACK/NAK report and the would-be regular ACK/NAK report are inconsistent, is fairly low.

At 1018, the method 700 may include retransmitting the DL data/PDSCH. The base station may retransmit the previous PDSCH in response to receiving a NAK in either the early ACK/NAK report or the regular ACK/NAK report.

In one example embodiment, the retransmission of downlink data such as a PUSCH may include a new signaling channel such as a PDCCH. If a PDCCH is included in the retransmission, the retransmitted PDCCH is viewed as a new PDCCH and overwrites the contents of the PDCCH for the initial PDSCH of the HARQ process.

In another example aspect, the retransmission of downlink data/DPSCH may not include a new PDCCH. In this case, the PDCCH for the initial PDSCH may be used by the UE. The parameters such as K1 from the original PDCCH may be applied to the retransmitted downlink data channel (PDSCH). In another example aspect, the K1 parameter may be applied to the original PDSCH, implying that there is no change in the uplink control channel (PUCCH) resource as originally configured in the initial PDCCH.

In some aspect, the base station may infer whether a previous PDCCH has been successfully received and decoded by the UE. For example, if the UE sends an NAK in the early ACK/NAK report using PUCCH resources configured with a PDCCH that the base station sent earlier, the base station can infer that the PDCCH has been successfully decoded. As a result, the original or a new PDCCH may not be included in the retransmission of PDSCH.

Not including PDCCH in the retransmission may have some advantageous effects, such as saving retransmission resource and power for retransmission. In one example aspect, the base station may preconfigure the UE with the PDSCH resource for retransmission via an RRC signaling. This way, there may not be a need to include a PDCCH in the downlink data retransmission/PDSCH. In another example aspect, the base station may partially preconfigure the UE with the PDSCH retransmission resource to avoid the retransmission of the PDCCH. For example, the base station may use the PDCCH to indicate a resource block location while preconfiguring a resource time offset via RRC message for the UE. This way, the base station may not have a need to include a PDCCH in the retransmission.

The method 1000 is for illustration purpose and shows one possible process for a base station to receive the two-stage ACK/NAK reporting. In practice, one or more steps shown in illustrative flowchart for the method 1000 may be combined with other steps, performed in any suitable order, performed in parallel (e.g., simultaneously or substantially simultaneously), or removed.

Figure 11:
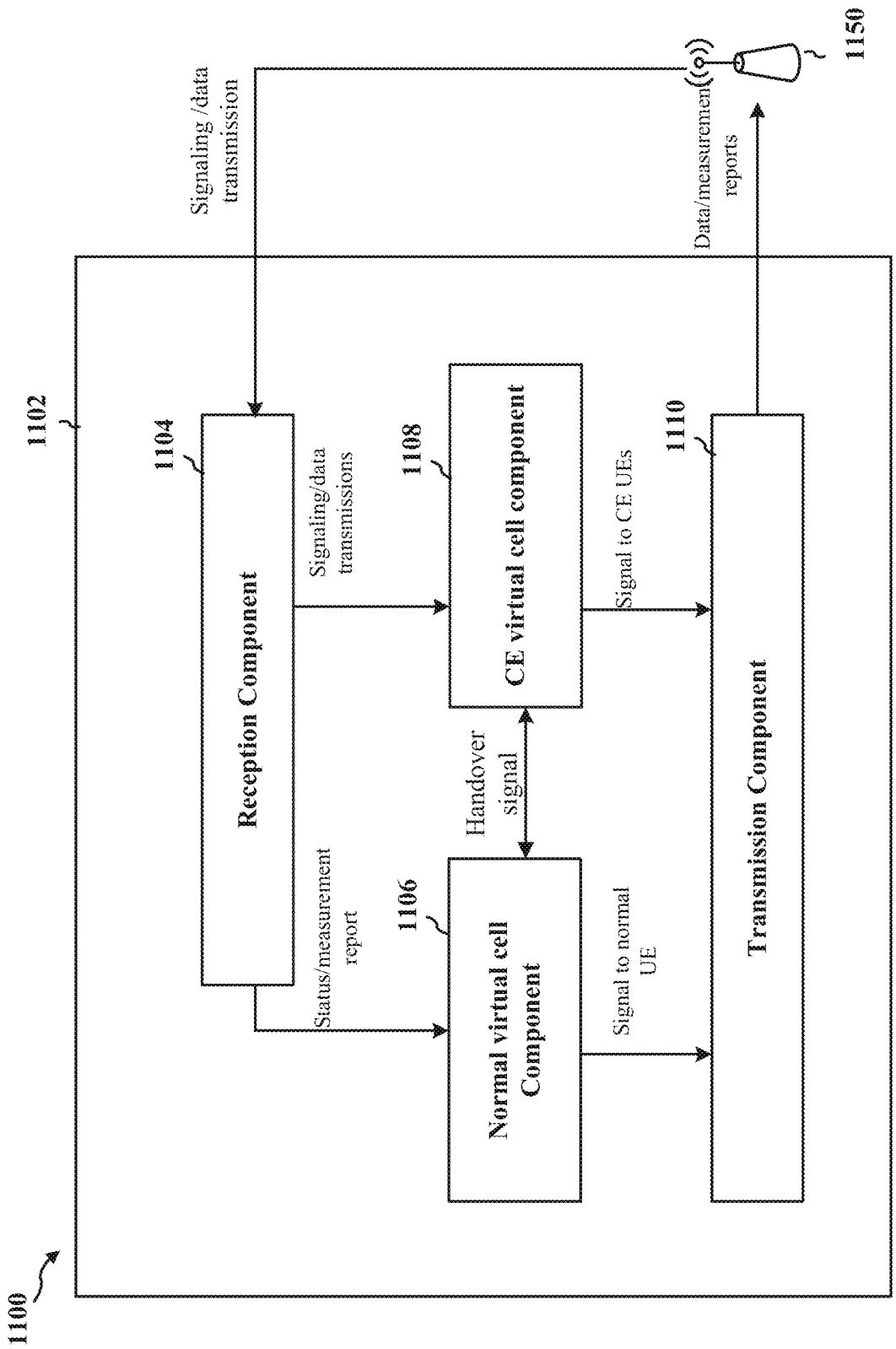
FIG. 11 is a conceptual data flow diagram illustrating the data flow between different modules/means/components in an example apparatus in accordance with one or more aspects of the present disclosure.

FIG. 11 is a conceptual data flow diagram 1100 illustrating the data flow between different modules/means/components in an example apparatus 1102. The apparatus 1102 may be a base station, such as one of the base stations 110s of FIG. 1 or the gNB 601 of FIG. 6, and/or the like. In some aspects, the apparatus 1102 includes a reception component/module 1104. The reception component 1104 may receive uplink transmission including ACK/NAK reports from a UE 1150 (e.g., the base station 110s and/or the like). In some aspects, the uplink transmission may include uplink data transmissions and various status reports from the UE, including early and regular ACK/NAK reports.

The apparatus 1102 also includes an early ACK/NAK component 1106 that may interpret a received early ACK/NAK report from the UE and determine whether to commit to an early retransmission. The apparatus 1102 also includes a regular ACK/NAK component/module 1108 that may interpret a received regular ACK/NAK report, compare/reconcile the regular ACK/NAK report with the received early ACK/NAK report, and determine whether to retransmit a PDSCH. The apparatus 1102 further includes the transmission component 1110 that may transmit grants for the early ACK/NAK resource and the regular ACK/NAK resource and transmit or retransmit downlink data and control channels.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
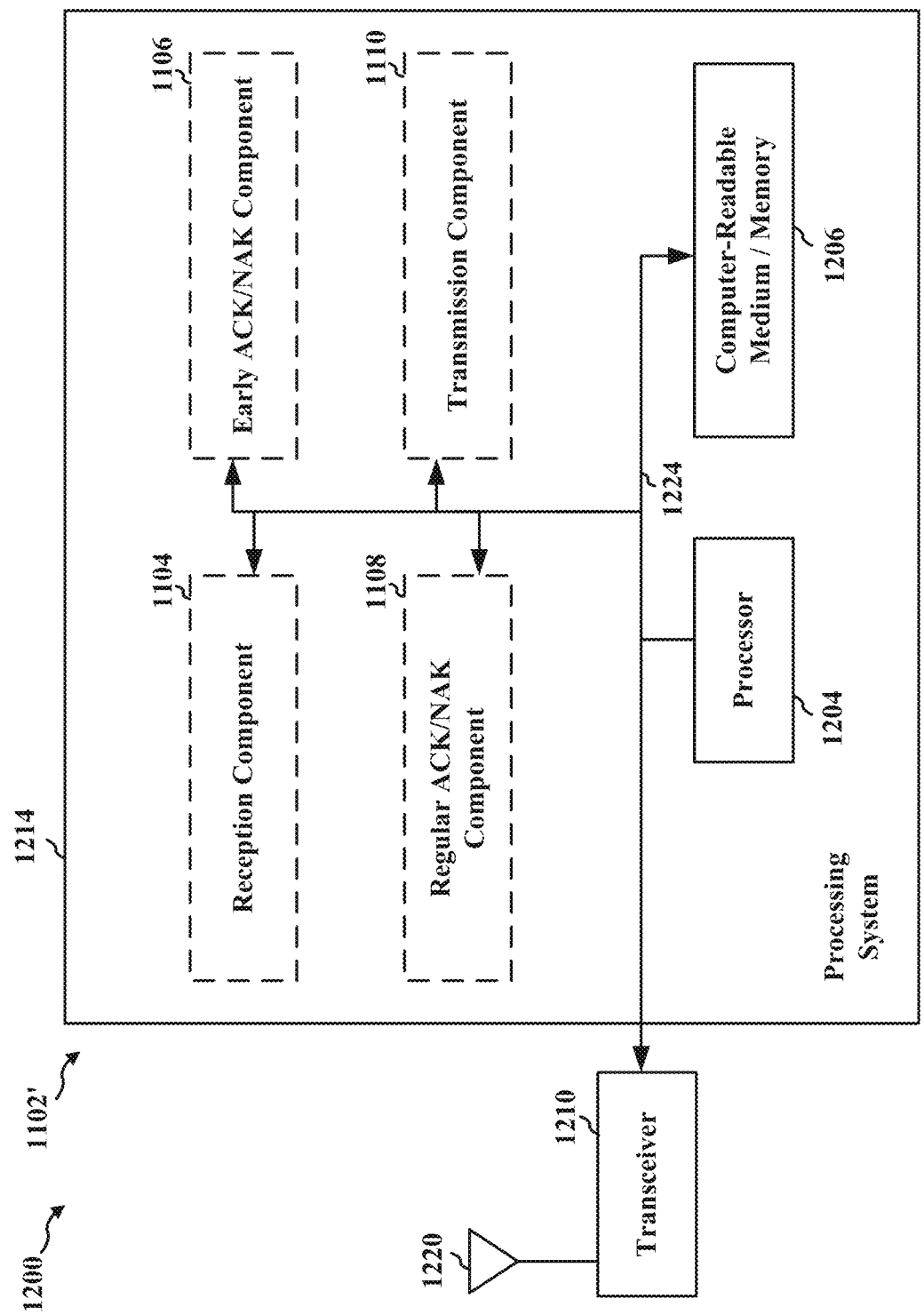
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the transmission component 1210. In addition, the transceiver 1210 receives information from the processing system 1214, specifically the reception component 804, and based on the received information, generates a signal to be applied to the one or more antennas 1220.

The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, and 1110. The components may be software components running in the processor 1204, resident/stored in the computer readable medium/memory 1206, one or more hardware components coupled to the processor 1204, or some combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   receiving one or more downlink control channels that schedule a downlink data channel for the UE and that indicate both a first acknowledgement or negative acknowledgement (ACK/NACK) resource for an early ACK/NACK and a second ACK/NACK resource for a regular ACK/NACK, the one or more downlink control channels including a first offset indication having a first value for a first time offset between the downlink data channel and the first ACK/NACK resource, the one or more downlink control channels including
   a second offset indication having a second value for a second time offset between the downlink data channel and the second ACK/NACK resource, wherein the second value is larger than the first value;
   partially decoding the downlink data channel based at least in part on the one or more downlink control channels; and
   transmitting the early ACK/NACK using the first ACK/NACK resource via an uplink control channel upon partially decoding the downlink data channel and before completely decoding the downlink data channel, wherein the early ACK/NACK indicates that the partial decoding of the downlink data channel was unsuccessful.

2. The method of claim 1, further comprising:
   transmitting the regular ACK/NACK using the second ACK/NACK resource after completing decoding of the downlink data channel; or
   skipping transmission of the regular ACK/NACK.

3. The method of claim 1, wherein the one or more downlink control channels comprise one or more dynamic downlink control channels.

4. The method of claim 1, further comprising:
   receiving a retransmission of the downlink data channel using a retransmission resource based at least in part on the early ACK/NACK.

5. The method of claim 4, wherein receiving of the retransmission of the downlink data channel comprises one of:
   receiving the retransmission of the downlink data channel with a second downlink control channel; or
   receiving the retransmission of the downlink data channel without the second downlink control channel, wherein the retransmission resource is at least partially preconfigured.

6. The method of claim 5, wherein receiving the retransmission of the downlink data channel comprises:
   receiving the retransmission of the downlink data channel with a third downlink control channel that overwrites contents of the second downlink control channel for a current HARQ process based at least in part on the early ACK/NACK.

7. The method of claim 5, wherein an uplink control channel resource is indicated in the second downlink control channel based at least in part on receiving the retransmission of the downlink data channel without receiving a third downlink control channel.

8. The method of claim 1, further comprising one of:
   multiplexing the early ACK/NACK with the regular ACK/NACK for an additional downlink data channel based at least in part on an early ACK/NACK resource overlapping with a regular ACK/NACK resource for the additional downlink data channel; or
   dropping one of the early ACK/NACK and the regular ACK/NACK that has a larger delay budget.

9. An apparatus for wireless communication at a user equipment (UE), comprising:
   means for receiving one or more downlink control channels that schedule a downlink data channel for the UE and that indicate both a first acknowledgement or negative acknowledgement (ACK/NACK) resource for an early ACK/NACK and a second ACK/NACK resource for a regular ACK/NACK, the one or more downlink control channels including a first offset indication having a first value for a first time offset between the downlink data channel and the first ACK/NACK resource, the one or more downlink control channels including
   a second offset indication having a second value for a second time offset between the downlink data channel and the second ACK/NACK resource, wherein the second value is larger than the first value;
   means for partially decoding the downlink data channel based at least in part on the one or more downlink control channels; and
   means for transmitting the early ACK/NACK using the first ACK/NACK resource via an uplink control channel upon partially decoding the downlink data channel and before completely decoding the downlink data channel, wherein the early ACK/NACK indicates that the partial decoding of the downlink data channel was unsuccessful.

10. The apparatus of claim 9, further comprising:
    means for transmitting the regular ACK/NACK using the second ACK/NACK resource after completing decoding of the downlink data channel; or
    means for skipping transmission of the regular ACK/NACK.

11. The apparatus of claim 9, wherein
    the one or more downlink control channels comprise one or more dynamic downlink control channels.

12. The apparatus of claim 9, further comprising:
    means for receiving a retransmission of the downlink data channel using a retransmission resource based at least in part on the early ACK/NACK.

13. The apparatus of claim 12, wherein the means for receiving the retransmission of the downlink data channel comprises one of:
    means for receiving the retransmission of the downlink data channel with a second downlink control channel; or
    means for receiving the retransmission of the downlink data channel without the second downlink control channel, wherein the retransmission resource is at least partially preconfigured.

14. An apparatus for wireless communications implemented at a user equipment (UE), comprising:
    one or more processors;
    memory coupled with the one or more processors; and
    one or more instructions stored in the memory and executable by the one or more processors to cause the apparatus to, based at least in part on the one or more instructions:
       receive one or more downlink control channels that schedule a downlink data channel for the UE and that indicate both a first acknowledgement or negative acknowledgement (ACK/NACK) resource for an early ACK/NACK and a second ACK/NACK resource for a regular ACK/NACK, the one or more downlink control channels including a first offset indication having a first value for a first time offset between the downlink data channel and the first ACK/NACK resource, the one or more downlink control channels including
a second offset indication having a second value for a second time offset between the downlink data channel and the second ACK/NACK resource, wherein the second value is larger than the first value;
partially decode the downlink data channel based at least in part on the one or more downlink control channels; and
transmit the early ACK/NACK using the first ACK/NACK resource via an uplink control channel upon partially decoding the downlink data channel and before completely decoding the downlink data channel, wherein the early ACK/NACK indicates that the partial decoding of the downlink data channel was unsuccessful.

15. The apparatus of claim 14, wherein the one or more instructions are further executable by the one or more processors to cause the apparatus to, based at least in part on the one or more instructions:
transmit the regular ACK/NACK using the second ACK/NACK resource after completing decoding of the downlink data channel; or
skip transmission of the regular ACK/NACK.

16. A method of wireless communication, comprising:
transmitting one or more downlink control channels that schedule a downlink data channel for a UE and that indicate both a first acknowledgement or negative acknowledgement (ACK/NACK) resource for an early ACK/NACK and a second ACK/NACK resource for a regular ACK/NACK, the one or more downlink control channels including a first offset indication having a first value for a first time offset between the downlink data channel and the first ACK/NACK resource, the one or more downlink control channels including
a second offset indication having a second value for a second time offset between the downlink data channel and the second ACK/NACK resource, wherein the second value is larger than the first value; and
receiving the early ACK/NACK using the first ACK/NACK resource via an uplink control channel based at least in part on a partial decoding of the downlink data channel and before a complete decoding of the downlink data channel, wherein the early ACK/NACK indicates that the partial decoding of the downlink data channel was unsuccessful.

17. The method of claim 16, further comprising:
receiving the regular ACK/NACK using the second ACK/NACK resource after a time period for the UE to complete decoding of the downlink data channel expires.

18. The method of claim 16, wherein the one or more downlink control channels comprise one or more dynamic downlink control channels.

19. The method of claim 16, further comprising:
retransmitting the downlink data channel using a retransmission resource based at least in part on the early ACK/NACK.

20. The method of claim 19, wherein retransmitting the downlink data channel comprises one of:
retransmitting the downlink data channel with a second downlink control channel; or
retransmitting the downlink data channel without the second downlink control channel based at least in part on the retransmission resource being at least partially preconfigured.

21. The method of claim 20, wherein retransmitting the downlink data channel comprises:
retransmitting the downlink data channel with a third downlink control channel that overwrites contents of the second downlink control channel for a current HARQ process based at least in part on the received early ACK/NACK indicating a NACK.

* * * * *